UNITED STATES PATENT OFFICE.

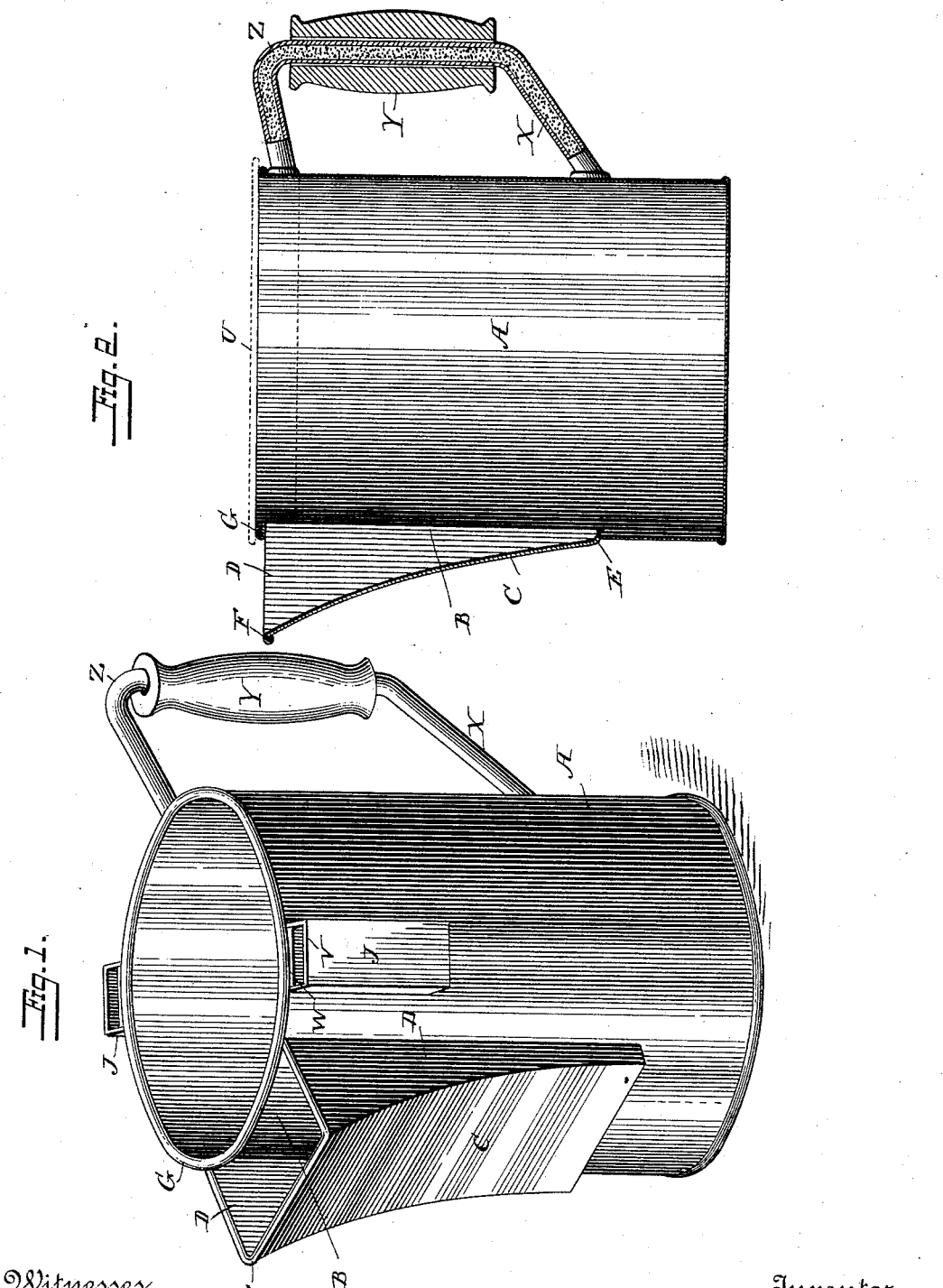

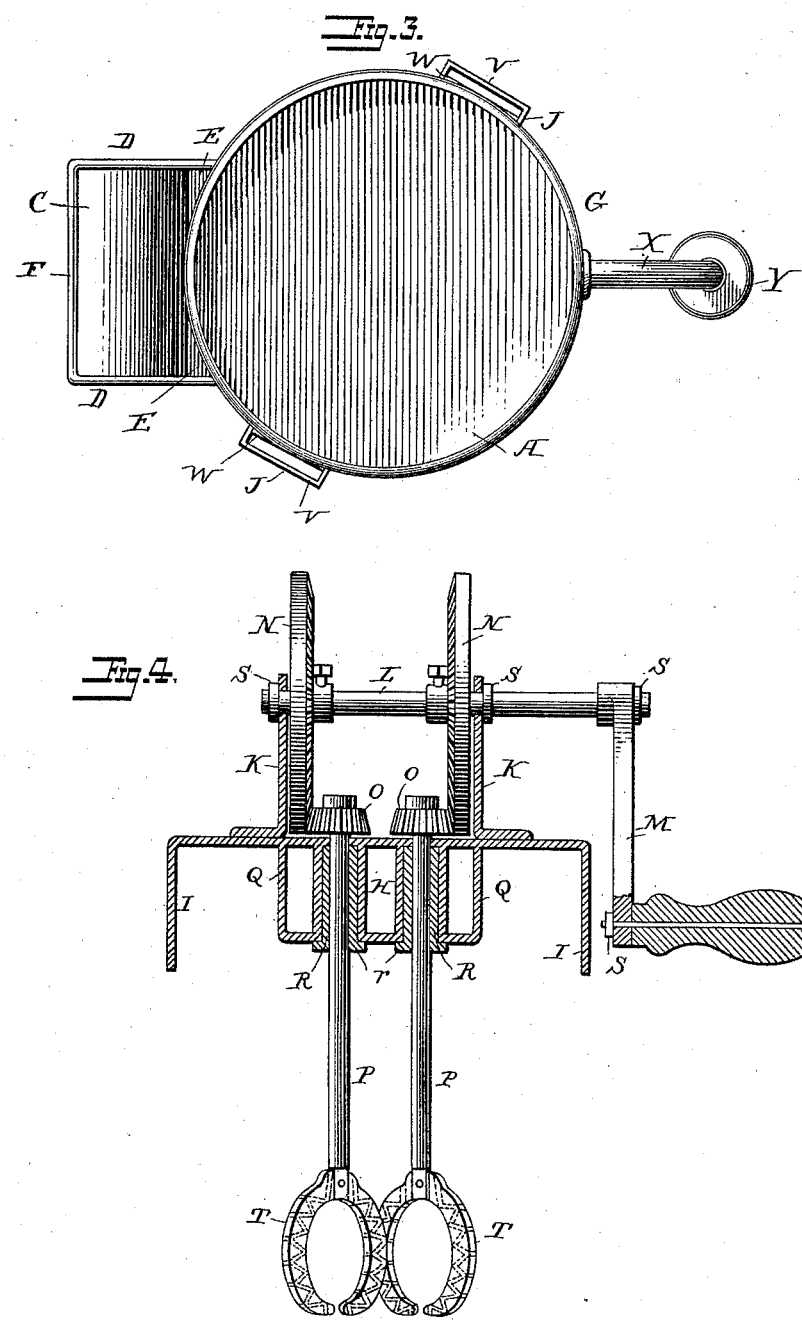

CHARLES J. MULFORD, OF NEW YORK, N. Y.

CHOCOLATE-POT.

SPECIFICATION forming part of Letters Patent No. 430,784, dated June 24, 1890.

Application filed December 16, 1889. Serial No. 333,963. (No model.)

*To all whom it may concern:*

Be it known that I, CHARLES J. MULFORD, a citizen of the United States, residing at New York, in the county and State of New York, have invented certain new and useful Improvements in Chocolate-Pots, of which the following is a specification.

My invention relates to chocolate-pots; and it consists in the improved mechanism for stirring or agitating the chocolate while it is being heated, and also in so constructing the vessel that the foam or fluff which is caused by the agitation can be poured out of the pot with the liquid chocolate, and, further, in providing the pot with a handle, by means of which it can be held without burning the hand, as will be hereinafter more fully set forth.

Referring to the accompanying drawings, Figure 1 is a perspective view of my improved pot with the cover and mechanism removed. Fig. 2 is a vertical sectional view of the same. Fig. 3 is a top plan view; and Fig. 4 is a sectional view of the detachable puddlers, with the frame for supporting and mechanism for operating them.

In making chocolate it is necessary that it be stirred or agitated while it is heating, as will be more fully described hereinafter, and which will necessarily cause its surface to be covered with a thick froth or foam, which it is desirable to have poured out into the cup or vessel from which the chocolate is to be used. In vessels heretofore used for making chocolate they have had a short oval spout, which is so narrow that the foam will impinge against its sides, and thus keep it within the vessel, while the liquid at the bottom will run out of the deep and narrow portion of the spout. As this foam is a very important part of the chocolate and should be equally distributed with the liquid portion as it is poured out into the different cups for use, a vessel having a spout which will not retard its free movement in pouring is a very important and valuable one. Such a vessel I have invented, and it forms one feature of this application, and consists in making the spout square—that is, the walls at right angles to each other in cross-section—instead of oval or circular, as heretofore constructed.

In making a chocolate-pot of the usual size the body portion A is preferably cylindrical in form and in the proportion of about four inches deep by about three inches wide, although this shape and size may be varied to suit the fancy. About one inch from the bottom on one side I cut or make a rectangular opening B, extending to the top and as wide as desired. I then secure the spout in place, which consists of the front piece C, the side walls D D, and the bottom E. The front piece C is a trifle wider than the opening, and is secured to the bottom just below the opening and projects upwardly and outwardly as far as desired. It is preferably curved, as shown, and has its upper end about on a level with the top of the pot. The side pieces D D may be cut from the same piece and be integral with the front, or be made separately from and secured thereto in any convenient manner. The forward edges must correspond with the curve or shape of the front portion C, and the rear edges are secured to the sides of the pot along the sides of the opening B, which will thus virtually make the side pieces triangular, or nearly so, as the lower portion or end must be wide enough to extend from the side of the pot out to the lower end of the front portion C, and which, owing to its being flat or straight and secured to a curved surface, projects tangentially from the middle of the opening to either side, thus leaving a small space on each side, which must be closed by the lower ends of the side pieces and also by the bottom E. The bottom in reality consists of two pieces substantially triangular in shape, with one side of each curved and extending from the lower ends of the side pieces along the bottom of the opening to the center and secured thereto. These pieces can also be made separate or be formed by bending in the lower portion of either the front or the side pieces.

The usual strengthening-wire F may be secured around the spout, and the larger and stiffer wire G around the top of the pot, across over the top of the opening, which will thus add the necessary rigidity to the vessel without interfering with the passage of the liquid and foam. With such a spout it is evident that when the vessel or pot is tipped forward to pour out the liquid the foam on top will move forward into the wide openmouthed spout entirely out to the tip, so that as the liquid passes out in a wide thin sheet the foam will be carried with it, and thus be deposited in the smaller vessel in an equal proportion to the amount of the liquid thus poured out. With a contracted or oval spout, however, when the pot is tipped forward, the light foam could only move into the spout a short distance before it would come in contact with the contracted walls, so that when the stream of chocolate, which is heavier than the foam, flows more freely out of the narrower tip or end of the spout it would have no foam over it, and consequently would pass out clear and free from foam, thus leaving a portion of the chocolate remaining in the pot to be thrown away, as the foam without the liquid is not so very desirable. The same would be true of beer, ale, or other foaming liquids as well as chocolate.

The mechanism for stirring the chocolate consists of a frame H, having two legs I I, which fit within ears J J upon the sides of the pot. Secured to the top of the frame H are two uprights or standards K K, in the upper ends of which is journaled the shaft or axle L, having a crank M at one end. Two bevel-wheels N N are suitably secured upon the axle by means of set-screws through their hubs or otherwise, which engage with two other similar wheels O O, which are rigidly secured upon the upper ends of the rods P P, passing down through the frame H into the pot. A brace Q is formed or secured upon the under side of the top portion of the frame H, through which the rods P P pass, thus giving a longer bearing for the rods, and by putting in the bushing R R around each rod, with a button $r$ on the lower end, a very durable bearing is formed for the rod. Washers are secured upon the axle and crank, as shown at S. Those at the standards K K prevent longitudinal movement of the axle, while the others secure the crank to the axle and the handle to the crank.

The puddlers or agitators T T are detachably secured upon the lower ends of the rods P P at right angles to each other, and are preferably made open at their lower portions. They may be made in the shape of a horseshoe, as shown in full lines, or provided with notches, as shown in dotted lines, or they may be made of wire as open rings. After the puddlers have been placed in the pot through the cover U, (shown only in dotted lines in Fig. 2, but fully shown and described in my application, Serial No. 317,474, filed June 7, 1889,) the crank can be operated, which will cause the puddlers to revolve very rapidly, which will thoroughly agitate the chocolate and prevent its settling at the bottom, especially when made very thick, and also cause the formation of the foam or fluff on top, which it is so desirable to have poured out with the liquid, as hereinbefore described. In larger vessels I prefer to use the ring form of puddlers, while with smaller vessels the horseshoe form gives better satisfaction, as they can be placed nearer together.

The ears upon the sides of the pot for the reception of the legs I I of the frame H are preferably made of two pieces, the outer one of which V is bent along its edges to form wings, by means of which it is secured to the side of the pot, while the inner piece W is secured to the wings and to the side of the pot, thus making a rectangular opening for the reception of the legs corresponding substantially to the shape of the legs and preventing any wabbling or moving about of the frame H.

In making good chocolate it is necessary that it be kept hot while it is being stirred or agitated, as above described, and when making only a small quantity it is preferable to use a small vessel; but the turning of the crank to operate the puddlers in a small vessel would tend to move the pot around, and hence it is more preferable to provide it with a handle X, by which the pot may be held stationary with one hand while the crank is operated by the other hand; but unless the handle be made a non-conductor of heat in some manner it soon becomes so hot from the heat of the pot that it burns the hand. To obviate this objection I have constructed the handle of hollow tubing—as of iron, copper, or brass—which is filled with some good non-conductor of heat—as alum, asbestus, plaster-of-paris, or cement—before it is secured to the sides of the pot, which may be done in any convenient or well-known manner. The presence of this material within the handle tends to prevent the conduction of heat through the thin metal shell surrounding it, or, rather, it absorbs what little heat is conducted before it reaches the portion that is farther removed from the pot and is grasped by the hand. To prevent even any small amount of heat that might not be absorbed from burning the hand and also to give a better grip and ease of manipulation of the pot Q, I provide the handle with a hollow wooden ferrule or shell Y, which can be slipped over the tube forming the handle before it is bent into shape or secured to the pot. This shell fits loosely on the tubing, so that the pot can be swung around from side to side without releasing or changing the grip of the hand, and is prevented from sliding up the handle when the pot is lifted by bending the handle into an angle Z between the horizontal portion that is secured to the side of the pot at the top and the vertical portion that is extended down through the shell and curved in and secured to the pot near the bottom. Instead of making the shell of wood, it can be made of ivory, gutta-percha, or other non-conductor of heat, and it can be finished with any design of ornamentation. In this way the handle can be made absolutely free from any disagreeable effects of the heat, and by retaining the shell in position by bending the tube it can be made cheaply and neat, as there are no unsightly lugs, rings, or ridges of any kind required to retain the shell in place. By securing the shell permanently to the handle, as above described, it is always there when needed, and by making it of wood or similar material and of a larger size than the tubing a firmer grip can be had, and it is not so liable to catch fire as would be a cloth when accidentally exposed to the fire for a short time.

Without limiting myself to the precise construction shown and described, I claim—

1. A chocolate-pot having a square opening in one side and a wide square spout around said opening, consisting of a front portion, two side pieces, and a bottom, substantially as described.

2. The combination, with a frame provided with lugs and a brace upon its inner side, of standards, an axle in the standards, rods in the frame and brace, a bushing around each rod, a detachable puddler upon the lower end of each rod at right angles to each other, and bevel-gearing upon the axle and the upper ends of the rods for operating the puddlers, substantially as described.

In testimony whereof I have signed my name to this specification in the presence of two subscribing witnesses.

CHARLES J. MULFORD.

Witnesses:
MARSHALL P. STAFFORD,
J. W. HAWES.